(12) United States Patent
Gorkin, III et al.

(10) Patent No.: US 12,440,609 B2
(45) Date of Patent: Oct. 14, 2025

(54) MOULDED POLYURETHANE HYDROGELS

(71) Applicant: Eudaemon Technologies Pty Ltd., Neutral Bay (AU)

(72) Inventors: Robert Gorkin, III, Sydney (AU); Simon Cook, Sydney (AU); David Shepherd, Sydney (AU)

(73) Assignee: Eudaemon Technologies Pty Ltd., Sydney (AU)

( * ) Notice: Subject to any disclaimer, the term of this patent is extended or adjusted under 35 U.S.C. 154(b) by 832 days.

(21) Appl. No.: 17/622,938

(22) PCT Filed: Jun. 27, 2020

(86) PCT No.: PCT/AU2020/050671
§ 371 (c)(1),
(2) Date: Dec. 27, 2021

(87) PCT Pub. No.: WO2020/257880
PCT Pub. Date: Dec. 30, 2020

(65) Prior Publication Data
US 2022/0226547 A1      Jul. 21, 2022

(30) Foreign Application Priority Data

Jun. 28, 2019   (AU) .................................. 2019902307

(51) Int. Cl.
*A61L 31/14*      (2006.01)
*A61L 31/06*      (2006.01)
(Continued)

(52) U.S. Cl.
CPC ............. *A61L 31/145* (2013.01); *A61L 31/06* (2013.01); *B29C 41/003* (2013.01); *B29C 41/14* (2013.01);
(Continued)

(58) Field of Classification Search
CPC .... A61L 31/145; A61L 31/06; A61L 2400/10; A61L 2300/404; A61L 2300/408;
(Continued)

(56) References Cited

U.S. PATENT DOCUMENTS

| 4,913,897 A | 4/1990 | Chvapil et al. |
| 5,334,691 A * | 8/1994 | Gould .................... C08G 18/65 623/7 |

(Continued)

FOREIGN PATENT DOCUMENTS

| EP | 2966104 B1 | 10/2018 |
| JP | 4667698 B2 * | 4/2011 | ............. A61L 27/18 |

(Continued)

OTHER PUBLICATIONS

Terry, JP-4667698-MT (Year: 2011).*

(Continued)

*Primary Examiner* — Robert S Jones, Jr.
*Assistant Examiner* — Zhen Liu
(74) *Attorney, Agent, or Firm* — Morgan, Lewis & Bockius LLP (57) ABSTRACT

The technology relates to a method of producing a moulded polyurethane hydrogel, for example a condom. The method involves forming a solution of at least one polyurethane having a molecular weight of between about 40000 to about 500000 in a water:organic polar solvent comprising less than about 40% (v/v) water; applying a layer of the solution to a mould; drying the layer of the first solution to form a polyurethane film on the mould; and contacting the polyurethane film with a swelling agent under conditions such that the film forms a polyurethane hydrogel with a swelling agent content of between about 1% to about 95%.

34 Claims, 1 Drawing Sheet

(51) Int. Cl.
- *B29C 41/00* (2006.01)
- *B29C 41/14* (2006.01)
- *B29C 41/22* (2006.01)
- *B29C 71/00* (2006.01)
- *B29K 75/00* (2006.01)
- *C08G 18/75* (2006.01)
- *C08J 3/075* (2006.01)
- *C08J 5/18* (2006.01)
- *B29L 31/00* (2006.01)

(52) U.S. Cl.
CPC .......... *B29C 41/22* (2013.01); *B29C 71/0009* (2013.01); *C08G 18/758* (2013.01); *C08J 3/075* (2013.01); *C08J 5/18* (2013.01); *A61L 2400/10* (2013.01); *B29K 2075/00* (2013.01); *B29L 2031/7538* (2013.01); *C08J 2375/06* (2013.01); *C08J 2375/08* (2013.01)

(58) Field of Classification Search
CPC ....... A61L 31/16; B29C 41/003; B29C 41/14; B29C 41/22; B29C 71/0009; B29C 39/025; B29C 39/10; B29C 41/00; C08G 18/758; C08G 2210/00; C08G 18/4236; C08G 18/4833; C08G 18/10; C08G 18/3206; C08G 18/8016; C08G 18/34; C08J 3/075; C08J 5/18; C08J 2375/06; C08J 2375/08; B29K 2075/00; B29K 2105/0073; B29L 2031/7538; A61F 6/04; A61F 2006/043; A41D 19/0055
See application file for complete search history.

(56) References Cited

U.S. PATENT DOCUMENTS

| | | | |
|---|---|---|---|
| 5,993,972 A * | 11/1999 | Reich | C08G 18/758 |
| | | | 428/424.8 |
| 6,389,602 B1 * | 5/2002 | Alsaffar | A61F 6/04 |
| | | | 2/161.7 |
| 2008/0076828 A1 * | 3/2008 | Dalton | A61P 13/12 |
| | | | 564/164 |
| 2017/0304815 A1 * | 10/2017 | Vachon | C08L 57/06 |

FOREIGN PATENT DOCUMENTS

| WO | 88/00214 A1 | 1/1988 | |
|---|---|---|---|
| WO | WO-8800214 A * | 1/1988 | ............... A61K 8/02 |
| WO | WO 94/22934 A1 | 10/1994 | |
| WO | WO 2004/029125 A1 | 4/2004 | |

OTHER PUBLICATIONS

International Search Report issued in corresponding International Patent Application No. PCT/AU2020/050671 dated Aug. 4, 2020.

\* cited by examiner

MOULDED POLYURETHANE HYDROGELS

TECHNICAL FIELD

The technology relates to polyether-based and polyester-based polyurethane hydrogels and their use in condoms.

CROSS REFERENCE TO RELATED APPLICATIONS

This application is a 35 U.S.C. § 371 national stage application of International Application No. PCT/AU2020/050671, filed Jun. 27, 2020, which claims priority to Australian provisional patent application no. 2019902307 which is incorporated by cross-reference in its entirety.

BACKGROUND

Condoms are often viewed as a contraceptive device but their action as a physical barrier also serves a valuable health function by reducing or preventing sexually transmitted disease such as herpes, chlamydia, syphilis, gonorrhea, hepatitis, human papillomavirus (HPV), trichomoniasis and acquired immune deficiency syndrome (AIDS) caused by human immunodeficiency virus (HIV).

Condoms are commonly manufactured from latex although other materials such as nitrile, nitrile rubber, polyurethane, AT-10 resin (a polyethylene resin), and polyisoprene are also used. Disadvantages of latex condoms and gloves are inherent allergic responses to the material and the sensitivity of latex rubber to oil-based lubricants leading to possible failure and transmission of disease. Additionally latex, like other commonly used materials, has a high coefficient of friction, which gives rise to the reported loss of sensation during use. This contributes to reduced use of condoms and increases the likelihood of transmission of disease. Polyurethane has some advantages over latex in that can be used with oil-based lubricants, is less allergenic than latex, and does not have an odor. However, polyurethane condoms are less elastic than latex and are more likely to slip or break, lose their shape or bunch up.

Protective gloves are typically manufactured from latex rubber, nitrile or nitrile rubber (a synthetic copolymer of acrylonitrile and butadiene), polyvinyl alcohol and polychloroprene. These materials offer varying protection against materials such as organic solvents, inorganic compounds and other hazardous materials but provide limited thermal and physical protection.

The present inventors have developed methods for producing moulded polyurethane hydrogels that are substantially impervious to biological agents and of sufficient strength and durability to be useful in the manufacture of barrier devices such as condoms and gloves.

SUMMARY

In a first aspect, there is provided a method of producing a moulded polyurethane hydrogel, the method comprising:
forming a first solution of at least one polyurethane having a molecular weight of between about 40000 to about 500000 in a water:organic polar solvent comprising less than about 40% (v/v) water;
applying a layer of the first solution to a mould;
drying the layer of the first solution to form a polyurethane film on the mould; and
contacting the polyurethane film with a swelling agent under conditions such that the film forms a polyurethane hydrogel with a swelling agent content of between about 1% to about 95%.

In an embodiment the molecular weight of the polyurethane is about 40000 to about 50000, or 50000 to about 75000, or 75000 to about 100000, or 100000 to about 125000, about 125000 to about 150000, about 150000 to about 175000, about 175000 to about 200000, about 200000 to about 225000, about 225000 to about 250000, about 250000 to about 275000, about 275000 to about 300000, about 300000 to about 3250000, about 325000 to about 350000, about 350000 to about 375000, about 375000 to about 400000, about 400000 to about 425000, about 4250000 to about 450000, about 450000 to about 475000, or about 475000 to about 500000.

In a preferred embodiment the molecular weight of the polyurethane is about 150000 to about 350000.

In an embodiment the polyurethane is derived from polymerisation of 4,4'-dicyclohexylmethane diisocyanate.

In an embodiment the polyurethane is a polyether- or polyester-based polyurethane.

In an embodiment the polyether-based polyurethane is derived from polymerisation of 4,4'-dicyclohexylmethane diisocyanate and a polyether.

In an embodiment the polyether comprises one to 35 ethyl ether groups.

In an embodiment the polyester-based polyurethane derived from polymerisation of 4,4'-dicyclohexylmethane diisocyanate and a polyester.

In an embodiment the polyester comprises one to 35 ethyl ester groups.

In an embodiment the polyurethane may have methyl and/or hydroxyl end groups.

In an embodiment the organic polar solvent is selected from the group consisting of ethanol, methanol, isopropanol, butanol, tetrahydrofuran, dimethylformamide, dimethylsulfoxide, acetone, acetonitrile and any combination thereof.

In an embodiment the organic polar solvent is ethanol.

In an embodiment the ratio of water:organic polar solvent is selected from about 5:95, about 10:90, about 15:85, about 20:80, about 25:75, about 30:70, about 35:65, or about 40:60.

In an embodiment the ratio of water:organic polar solvent is about 10:90.

In an embodiment the swelling agent is selected from at least one of water, a glycol solution, a hydroxyethylcellulose solution, a paraben-based solution, a glycol-based solution, a glycerine-based solution, an oil-based solution, or a silicone-based solution.

In an embodiment the swelling agent comprises one or more of spermicide, lubricating agent, antiviral, antifungal, antimicrobial, prebiotic, probiotic, microbiome enhancer, flavour compound, aroma compound, sensation enhancing agent, sterilization agent, or disinfecting agent.

In an embodiment the polyurethane film is contacted with the swelling agent for about 1 to about 30 seconds. In some embodiments the polyurethane film is contacted with the swelling agent for up to 24 hours, for example about 15 mins, about 30 mins, about 45 mins, about 1 hour, about 2, hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours.

In an embodiment the temperature of the swelling solution is about 20° C. to about 90° C. For example the temperature may be about 20° C., about 25° C., about 30° C., about 35° C., about 40° C., about 45° C., about 50° C., about 55° C., about 60° C., about 65° C., about 70° C., about 75° C., about 80° C., about 85° C., or about 90° C.

In an embodiment the method further comprises:
- forming a second solution of a polyurethane having a molecular weight of between about 40000 to about 50000, or 50000 to about 75000, or 75000 to about 100000, or 100000 to about 125000, about 125000 to about 150000, about 150000 to about 175000, about 175000 to about 200000, about 200000 to about 225000, about 225000 to about 250000, about 250000 to about 275000, about 275000 to about 300000, about 300000 to about 3250000, about 325000 to about 350000, about 350000 to about 375000, about 375000 to about 400000, about 400000 to about 425000, about 4250000 to about 450000, about 450000 to about 475000, or about 475000 to about 500000, in a water: organic polar solvent comprising less than about 40% (v/v) water;
- applying a layer of the second solution to the polyurethane film on the mould;
- drying the layer of the second solution, wherein the layers form a polyurethane film on the mould; and
- contacting the polyurethane film with a swelling agent under conditions such that the film forms a polyurethane hydrogel with a swelling agent content of between about 1% to about 95%.

In one embodiment the polyurethane comprises —$CH_2$—($CH_2$—O—$CH_2$)$_n$—$CH_2$—[O—OCHN($C_6H_{10}$)$CH_2$($C_6H_{10}$)NHCO—O—($CH_2CH_2$—O—$CH_2CH_2$)—O—OCHN($C_6H_{10}$)$CH_2$($C_6H_{10}$) NHCO—NH—($C_6H_{10}$)$CH_2$($C_6H_{10}$)NHCO—O—$CH_2CH_2$—O—$CH_2CH_2$—O—OCHN($C_6H_{10}$)$CH_2$($C_6H_{10}$)NHCO—O]$_m$—$CH_2$—($CH_2$—O—$CH_2$)$_n$—$CH_2$, wherein
- n is an average independently selected from any number from 1 to 35; and
- m is an average independently selected from any number from 15 to 500.

In some embodiments the relationship between n and m may be a ratio.

In some embodiments the ratio of n:m may be from about 1:0.1 to about 1:75.

In some embodiments the at least one polyurethane in the second solution may not be not the same as the at least one polyurethane in the first solution.

In an embodiment the method further comprises applying a subsequent layer of the first or second solution to the polyurethane film on the mould to increase thickness, or to create a specific feature, of the polyurethane film.

In an embodiment the method further comprises applying a subsequent layer of the first or second solution to a portion of the polyurethane film on the mould to increase thickness or to create a specific feature on a portion of the polyurethane film.

The specific feature formed from the subsequent layer may have a different modulus, tensile strength, and/or linear expansion range than the hydrogel formed from the layer to which it is applied.

In an embodiment either or both of the molecular weight and n:m ratio of the at least one polyurethane in the first solution is different to the molecular weight and/or the n:m ratio of the at least one polyurethane in the second solution.

In an embodiment additional subsequent layers are applied to increase the thickness to a predetermined value.

In an embodiment the moulded polyurethane hydrogel has a linear expansion range of about 1% to about 100%.

In an embodiment the moulded polyurethane hydrogel has a tensile strength of about 1 MPa to about 20 MPa, about 20 MPa to 40 MPa, about 40 MPa to about 60 MPa, about 80 MPa to about 100 MPa.

In a preferred embodiment the moulded polyurethane hydrogel has a tensile strength of about 20 MPa to 40 MPa, for example 20 MPa, 22 MPa, 24 MPa, 26 MPa, 28 MPa, 30 MPa, 32 MPa, 34 MPa, 36 MPa, 38 MPa, or about 40 MPa.

In an embodiment the moulded polyurethane hydrogel has an elongation at break range of about 200% to about 2000%.

In an embodiment the moulded polyurethane hydrogel has a shear modulus of about 50% modulus of about 80 kPa to about 15 MPa, 100% modulus of about 200 kPa to about 15 MPa and a 300% modulus of about 700 kPa to about 15 MPa.

In a second aspect there is provided a moulded polyurethane hydrogel condom produced by the first aspect.

In a third aspect there is provided a moulded polyurethane hydrogel condom, wherein the polyurethane hydrogel comprises one or more polyurethanes having a molecular weight of between about 40000 to about 500000 and a swelling agent content of between about 1% to about 95%.

In an embodiment the molecular weight of the polyurethane is about 40000 to about 50000, or 50000 to about 75000, or 75000 to about 100000, or 100000 to about 125000, about 125000 to about 150000, about 150000 to about 175000, about 175000 to about 200000, about 200000 to about 225000, about 225000 to about 250000, about 250000 to about 275000, about 275000 to about 300000, about 300000 to about 3250000, about 325000 to about 350000, about 350000 to about 375000, about 375000 to about 400000, about 400000 to about 425000, about 4250000 to about 450000, about 450000 to about 475000, or about 475000 to about 500000.

In an embodiment the polyurethane is derived from polymerisation of 4,4'-dicyclohexylmethane diisocyanate.

In an embodiment the polyurethane is a polyether- or polyester-based polyurethane.

In an embodiment the polyether-based polyurethane is derived from polymerisation of 4,4'-dicyclohexylmethane diisocyanate and a polyether.

In an embodiment the polyether comprises one to 35 ethyl ether groups.

In an embodiment the polyester-based polyurethane derived from polymerisation of 4,4'-dicyclohexylmethane diisocyanate and a polyester.

In an embodiment the polyester comprises one to 35 ethyl ester groups.

In an embodiment the moulded polyurethane hydrogel condom has one or more of linear expansion range of about 1% to about 100%, tensile strength of about 1 MPa to about 100 MPa, elongation at break range of about 200% to about 2000%, and at least one of 80 kPa to about 15 MPa, 100% modulus of about 200 kPa to about 15 MPa and a 300% modulus of about 700 kPa to about 15 MPa.

In an embodiment the condom is substantially impervious to biological agents having an average diameter of 30 nm or greater.

In an embodiment the condom is substantially impervious to biological agents having an average diameter of 30 nm or greater under simulated usage pressures of up to about 10 kilopascals are applied to the condom, for example the usage pressures may be up to about 1 kPa, up to about 2 kPa, up to about 3 kPa, up to about 4 kPa, up to about 5 kPa, up to about 6 kPa, up to about 7 kPa, up to about 8 kPa, up to about 9 kPa, or up to about 10 kPa.

In an embodiment the condom has an airburst volume of about 5 L to about 50 L.

In an embodiment the condom has an airburst pressure of about 1 kPa to about 5 kPa, for example 1.3 kPa to about 3.6 kPa.

Definitions

Throughout this specification, unless the context clearly requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Throughout this specification, the term 'consisting of' means consisting only of.

Any discussion of documents, acts, materials, devices, articles or the like which has been included in the present specification is solely for the purpose of providing a context for the present technology. It is not to be taken as an admission that any or all of these matters form part of the prior art base or were common general knowledge in the field relevant to the present technology as it existed before the priority date of each claim of this specification.

Unless the context requires otherwise or specifically stated to the contrary, integers, steps, or elements of the technology recited herein as singular integers, steps or elements clearly encompass both singular and plural forms of the recited integers, steps or elements.

In the context of the present specification the terms 'a' and 'an' are used to refer to one or more than one (i.e., at least one) of the grammatical object of the article. By way of example, reference to 'an element' means one element, or more than one element.

In the context of the present specification the term 'about' means that reference to a figure or value is not to be taken as an absolute figure or value, but includes margins of variation above or below the figure or value in line with what a skilled person would understand according to the art, including within typical margins of error or instrument limitation. In other words, use of the term 'about' is understood to refer to a range or approximation that a person or skilled in the art would consider to be equivalent to a recited value in the context of achieving the same function or result.

Those skilled in the art will appreciate that the technology described herein is susceptible to variations and modifications other than those specifically described. It is to be understood that the technology includes all such variations and modifications. For the avoidance of doubt, the technology also includes all of the steps, features, and compounds referred to or indicated in this specification, individually or collectively, and any and all combinations of any two or more of said steps, features and compounds.

In order that the present technology may be more clearly understood, preferred embodiments will be described with reference to the following drawings and examples.

DESCRIPTION OF EMBODIMENTS

The present invention is based on methods for producing moulded polyurethane hydrogels (either polyether or polyester-based). The hydrogels produced by the methods have a number of properties such as linear expansion, tensile strength, elongation at break range, modulus, and imperviousness to biological agents that individually or in combination make them suitable for use in barrier devices such as condoms and gloves.

The methods disclosed herein require the formation of a solution of a solution of a polyurethane in a water:organic polar solvent. A layer of the solution is then applied to a mould, for example by dipping the mould into the solution. Once the layer is applied it is dried and forms a polyurethane film on the mould. Additional layer(s) of the solution, or a different solution (for example using a different polyurethane), can then be applied. Once the layers have been dried, the film can then be contacted with a swelling agent, for example an aqueous solution that may contain a buffer, a salt and/or a preservative. The swelling agent infiltrates the film such that a polyurethane hydrogel is formed, the hydrogel typically has a swelling agent content of between about 1% to about 95% but is typically around 30-90% for water based swelling agents. For oil or silicone based swelling agents, the hydrogel typically has a swelling agent content of between about 0.1% to about 30%, for example, about 0.1% to about 10% after contact with the swelling agent for 24 hours.

Polyurethane

As used herein the term 'polyurethane' refers to a polymer obtained from a reaction of an isocyanate and an alcohol, where the isocyanate contains two or more isocyanate functional groups.

A number of polyurethanes are useful in the methods described herein. Suitable polyurethanes include those derived from polymerisation of: 4,4'-dicyclohexylmethane diisocyanate; 4,4'-dicyclohexylmethane diisocyanate and a polyether; 4,4'-dicyclohexylmethane diisocyanate and a polyester, or any combination thereof.

In an embodiment the polyurethane is a hydrophilic polyurethane block copolymer such as a hydrophilic polyurethane block copolymer comprising 4,4'-dicyclohexylmethane diisocyanate. The hydrophilic polyurethane block copolymer may comprise repeating ethyl ether groups, for example the hydrophilic polyurethane block copolymer comprises at least one to 50 repeating ethyl ether groups.

In another embodiment, the hydrophilic polyurethane block copolymer is a polyether-based polyurethane. For example, the hydrophilic polyurethane block copolymer comprises 4,4'-dicyclohexylmethane diisocyanate and an ethyl ether. The hydrophilic polyurethane block copolymer may comprise 4,4'-dicyclohexylmethane diisocyanate and repeating ethyl ether groups, for example at least four repeating ethyl ether groups. In another embodiment the hydrophilic polyurethane block copolymer comprises 4,4'-dicyclohexylmethane diisocyanate and one to 35 repeating ethyl ether groups.

The hydrophilic polyurethane block copolymer may comprise repeating ethyl ester groups, for example the hydrophilic polyurethane block copolymer may comprise at least one to 35 repeating ethyl ester groups.

In another embodiment, the hydrophilic polyurethane block copolymer is a polyester-based polyurethane. For example, the hydrophilic polyurethane block copolymer comprises 4,4'-dicyclohexylmethane diisocyanate and an ethyl ester. The hydrophilic polyurethane block copolymer may comprise 4,4'-dicyclohexylmethane diisocyanate and repeating ethyl ester groups, for example at least four repeating ethyl ester groups. In another embodiment, the hydrophilic polyurethane block copolymer comprises 4,4'-dicyclohexylmethane diisocyanate and one to 35 repeating ethyl ester groups.

In an embodiment, the polyurethane has a molecular weight of between about 40000 to about 500000, for example the molecular weight can be about 40000 to about 50000, or 50000 to about 75000, or 75000 to about 100000, or 100000 to about 125000, about 125000 to about 150000, about 150000 to about 175000, about 175000 to about 200000, about 200000 to about 225000, about 225000 to about 250000, about 250000 to about 275000, about 275000 to about 300000, about 300000 to about 3250000, about 325000 to about 350000, about 350000 to about 375000, about 375000 to about 400000, about 400000 to about 425000, about 4250000 to about 450000, about 450000 to about 475000, or about 475000 to about 500000.

In an embodiment, the hydrophilic polyurethane block copolymer has a molecular weight of about 40000 to about 50000, or 50000 to about 75000, or 75000 to about 100000, or 100000 to about 125000, about 125000 to about 150000, about 150000 to about 175000 about 175000 to about 200000, about 200000 to about 225000, about 225000 to about 250000, about 250000 to about 275000, about 275000 to about 300000, about 300000 to about 3250000, about 325000 to about 350000, about 350000 to about 375000, about 375000 to about 400000, about 400000 to about 425000, about 4250000 to about 450000, about 450000 to about 475000, or about 475000 to about 500000.

In an embodiment, the polyester-based polyurethane has a molecular weight of about 40000 to about 50000, or 50000 to about 75000, or 75000 to about 100000, or 100000 to about 125000, about 125000 to about 150000, about 150000 to about 175000, about 175000 to about 200000, about 200000 to about 225000, about 225000 to about 250000, about 250000 to about 275000, about 275000 to about 300000, about 300000 to about 3250000, about 325000 to about 350000, about 350000 to about 375000, about 375000 to about 400000, about 400000 to about 425000, about 4250000 to about 450000, about 450000 to about 475000, or about 475000 to about 500000.

In an embodiment, the polyether-based polyurethane has a molecular weight of about 40000 to about 50000, or 50000 to about 75000, or 75000 to about 100000, or 100000 to about 125000, about 125000 to about 150000, about 150000 to about 175000, about 175000 to about 200000, about 200000 to about 225000, about 225000 to about 250000, about 250000 to about 275000, about 275000 to about 300000, about 300000 to about 3250000, about 325000 to about 350000, about 350000 to about 375000, about 375000 to about 400000, about 400000 to about 425000, about 4250000 to about 450000, about 450000 to about 475000, or about 475000 to about 500000.

In an embodiment, the polyurethane comprises: $CH_2$—$(CH_2$—$O$—$CH_2)_n$—$CH_2$—$[O$—$OCHN(C_6H_{10})CH_2(C_6H_{10})NHCO$—$O$—$(CH_2CH_2$—$O$—$CH_2CH_2)$—$O$—$OCHN(C_6H_{10})CH_2(C_6H_{10})$ $NHCO$—$NH$—$(C_6H_{10})CH_2(C_6H_{10})NHCO$—$O$—$CH_2CH_2$—$O$—$CH_2CH_2$—$O$—$OCHN(C_6H_{10})CH_2(C_6H_{10})NHCO$—$O]_m$—$CH_2$—$(CH_2$—$O$—$CH_2)_n$—$CH_2$— where n is independently selected from any number from 1 to 35, for example 1, 2, 3, 4, 5, 6, 7, 8, 9, 10, 11, 12, 13, 14, 15, 16, 17, 18, 19, 20, 21, 22, 23, 24, 25, 26, 27, 28, 29, 20, 32, 32, 33, 34, or 35; and m is independently selected from any number from 15 to 500, for example 15, 25, 50, 75, 100, 125, 150, 175, 200, 225, 25, 275, 300, 325, 350, 375, 400, 425, 450, 475, or 500.

In some embodiments either or both of n and m are averages.

In one embodiment n is an average of 1.5 and m is 10-20, for example 10, 11, 12, 13, 14, 15, 16, 17, 18, 19, or 20. In one embodiment m is 15.

In one embodiment n is an average of 4 and m is an average of 100-120, for example 100, 101, 102, 103, 104, 105, 106, 107, 108, 109, 110, 111, 112, 113, 114, 115, 116, 117, 118, 119, or 120. In one embodiment m is 108.

In one embodiment n is an average of 5 and m is an average of 105-130, for example 105, 106, 107, 108, 109, 110, 111, 112, 113, 114, 115, 116, 117, 118, 119, 120, 121, 122, 123, 124, 125, 126, 127, 128, 129, or 130. In one embodiment m is 110.

In one embodiment n is an average of 34 and m is an average of 75-85, for example 75, 76, 77, 78, 79, 80, 81, 82, 83, 84, or 85. In one embodiment m is 80.

In one embodiment n is an average of 4 and m is an average of 180-220, for example 180, 182, 184, 186, 190, 192, 194, 196, 198, 200, 202, 204, 206, 208, 210, 212, 214, 216, 218, or 220.

In one embodiment n is an average of 30.5 and m is an average of 140-160, for example 140, 142, 148, 150, 152, 154, 156, 158, or 160.

In one embodiment n is an average of 7 and m is an average or 200-240, for example 200, 202, 204, 206, 208, 210, 212, 214, 216, 218, 220, 222, 224, 226, 228, 230, 232, 234, 236, 238, or 240.

In one embodiment the end groups of the polyurethane are independently selected from methyl and hydroxyl.

Water:Organic Polar Solvent

The methods disclosed herein require formation of a solution of the polyurethane in a water:organic polar solvent. The polyurethane can be solubilised in the solvent before the addition of water or the polyurethane can be solubilised in the water:organic polar solvent.

The polar solvent may be protic or aprotic. The solvent may be any lower aliphatic alcohol or chlorinated solvent. For example the solvent may be selected from to group comprising ethanol, methanol, isopropanol, butanol, tetrahydrofuran, dimethylformamide, dimethylsulfoxide, acetone, acetonitrile and any combination thereof.

The ratio of water:organic solvent may be about 5:95, about 10:90, about 15:85, about 20:80, about 25:75, about 30:70, about 35:65, or about 40:60.

The water:organic solvent used to prepare the solution of polyurethane may be at room temperature or at an elevated temperature, for example between about 25° C. and about 60° C., for example the solution water:organic solvent may be heated to about 25° C., about 30° C., about 35° C., about 40° C., about 45° C., about 50° C., about 55° C. or about 60° C.

The concentration of the polyurethane in the water:organic polar solvent is between about 1% and about 20% (w/v), for example the concentration may be about 1% (w/v), about 2% (w/v), about 3% (w/v), about 4% (w/v), about 5% (w/v), about 6% (w/v), about 7% (w/v), about 8% (w/v), about 9% (w/v), about 10% (w/v) about 11% (w/v), about 12% (w/v), about 13% (w/v), about 14% (w/v), about 15% (w/v), about 16% (w/v), about 17% (w/v), about 18% (w/v), about 19% (w/v) or about 20% (w/v). In one embodiment, the polyurethane has a concentration of about 6% (w/v).

Moulds

The methods disclosed herein require the application of the polyurethane solution to a mould. Any mould shape may be used to prepare articles such as condoms, gloves, films, or other formats and devices. In some embodiments, an existing device (such as a condom), can be used as a mould.

For example, the mould can be a mandrel, cast, plate or sheet. In embodiments where condoms are being produces the mould can be cylindrical or a phallus.

In some embodiments the mould is glass, ceramic (e.g. TiN), plastic, metal or a combination of materials or coatings.

In an embodiment the mould is heated. For example the mould may be heated to any temperature up to about 90° C. using convection, infrared, electromagnetic induction or conduction.

The polyurethane solution is applied to the mould to form a layer of the solution over at least a portion of the mould. This can be achieved for example by dipping the mould into the solution or by spraying, pouring, injecting, brushing or rolling the solution onto or into the mould, or any combination of these methods.

The polyurethane solution may be applied to the mould at room temperature or may be heated before application to the mould. For example the polyurethane solution may be heated to a temperature of about 37° C. (with or without stirring) before application to the mould.

In some embodiments the mould is stationary when the solution is applied. In other embodiments mould is in motion when the polyurethane solution is applied.

In an embodiment, the mould is dipped into the polyurethane solution at a speed of about 1 mm/s to about 1000 mm/s. For example the dipping speed may be about 1 mm/s, about 50 mm/s, about 100 mm/s, about 200 mm/s, about 300 mm/s, about 400 mm/s, about 500 mm/s, about 600 mm/s, about 700 mm/s, about 800 mm/s, about 900 mm/s, or about 1000 mm/s.

In an embodiment, the mould is withdrawn from the polyurethane solution at a speed of 1 mm/s to about 1000 mm/s. For example the withdrawal speed may be about 1 mm/s, about 50 mm/s, about 100 mm/s, about 200 mm/s, about 300 mm/s, about 400 mm/s, about 500 mm/s, about 600 mm/s, about 700 mm/s, about 800 mm/s, about 900 mm/s, or about 1000 mm/s, Varying the speed of dipping and/or withdrawal can be used to control the thickness of the polyurethane film.

After a layer of the polyurethane solution is applied to the mould, the solution is dried to form a film on the mould. Drying may be achieved by evaporation in the open atmosphere or in an oven or evaporator.

In some embodiments drying may occur while the mould is stationary. In other embodiments drying may occur while the mould is in motion.

In some embodiments the mould is heated to facilitate drying. For example the mould may be heated up to about 90° C., using convection, infrared, electromagnetic induction or conduction.

The polyurethane solution may be dried at room temperature or an elevated temperature, for example from about 25° C. to about 90° C. The elevated temperature may be about 25° C., about 30° C., about 35° C., about 37° C., about 40° C., about 45° C., about 55° C., about 60° C., about 65° C., about 70° C., about 75° C., about 80° C., about 85° C., or about 90° C.

Once the film is formed on the mould, additional applications of a polyurethane solution may be made. In some embodiments multiple polyurethane solutions may be utilised. For example a first polyurethane solution (e.g. using a polyurethane having a molecular weight of between about 40000 to about 500000) may be applied. A second application, using either the same solution or a different solution (using a polyurethane having a molecular weight of between about 40000 to about 500000) may be performed. Further applications of polyurethane solutions may be performed. For example, there may be two, three, four, five, six or more cycles of applying a polyurethane solution and drying the solution. In this way any number of the disclosed polyurethane solutions may be used to prepare a multilayered polyurethane film on the mould.

In some embodiments the polyurethane solution may be applied to all or a portion of the mould. For example the polyurethane solution may be applied to a portion of the mould, or a portion of a polyurethane film on the mould, in order to increase the thickness of the film over part of the mould or to create a specific feature, such as ribbing, on a portion of the mould or polyurethane film on the mould.

Each layer of the multi-layered polyurethane film may have different physical properties. For example, a polyurethane solution that by itself may be, for example too weak to make a condom but has desirable qualities such as skin-like feel, can be used in combination with one or more other polyurethane solutions in order to prepare a multilayered polyurethane film on the mould. One or more layers can provide at least one of tensile strength, linear expansion and modulus and other layers provide for example a skin-like feel or a moist skin-like feel.

In one embodiment a condom is formed out of at least two different polyurethane solutions, for example to form inner and outer layers of different polyurethanes. In this embodiment each layer has properties that provide a different feel on either side of the condom. For example the different polyurethanes may have different moduli, tensile strengths, linear expansion ranges, and/or elongation at break.

In some embodiments the use of different polymer solutions can require adhesion between the layers. This adhesion may be achieved by application of a polyurethane solution to a dried film such that a portion of the dried film become solubilised or the applied solution diffuses into the dried film. Alternatively, an adhesive agent may be applied to the film prior to application of further polyurethane solution.

In some embodiments the polymer solutions can be moulded to non-hydrogel materials as a layer for structure and/or features. For example, the polymer solutions may be moulded to latex, polyisoprene, non-hydrating polyurethanes, and other typical or atypical materials for devices including condoms.

The polymer solution may be applied to all or part of an internal or external portion of the non-hydrogel material, for example the inside, internal, or external portion of a device such as a condom.

An initial polymer film or multi-layered film may be dried prior to application of subsequent polyurethane solution. Alternatively, application of subsequent amounts of polyurethane solution may be made without drying of the preceding application.

In some embodiments repeated applications of a polyurethane solution can be used to produce a polyurethane film of a predetermined thickness, for example about 50 to about 200 microns. The predetermined thickness may be about 10 microns, about 20 microns, about 30 microns, about 40 microns, about 50 microns, about 60 microns, about 70 microns, about 80 microns, about 90 microns, about 100 microns, about 110 microns, about 120 microns, about 130 microns, about 140 microns, about 150 microns, about 160 microns, about 170 microns, about 180 microns, about 190 microns or about 200 microns. In some embodiments the predetermined thickness is about 70 microns to about 80 microns.

Swelling Agent

The methods disclosed herein required contacting the polyurethane film or multilayered polyurethane film with a swelling agent under conditions such that the film forms a polyurethane hydrogel.

The swelling agent may comprise or consist of water. In other embodiments the swelling agent is one or more of an aqueous solution, a hydroxyethylcellulose solution, a paraben-based solution, a glycol-based solution, a glycerine based solution, an oil-based solution, or a silicone-based solution. In some embodiments the swelling agent may be one or more of the solutions.

In one embodiment the swelling agent is water.

The swelling agent may comprise of a spermicide, lubricating agent, antiviral, antifungal, antimicrobial, prebiotic, probiotic, microbiome enhancer, flavour compound, aroma compound, sensation enhancing agent, sterilization agent, or disinfecting agent.

The polymer film may be dipped into the swelling agent and withdrawn immediately. Alternatively, the polymer film or material may be dipped into the swelling agent and allowed to dwell in contact with the agent for a time before being withdrawn. The polymer film or material may remain on the mould while in contact with the agent, alternatively, the polymer film may be removed from the mould prior to contact with the swelling agent.

In some embodiments the polyurethane film is contacted with the swelling agent for about 1 to about 60 seconds. This may be followed either immediately or at a later by a further contact with a swelling agent.

In other embodiments the polyurethane film is contacted with the swelling agent overnight of for up to about 24 hours. For example, the polyurethane film is contacted with the swelling agent for about 15 mins, about 30 mins, about 45 mins, about 1 hour, about 2, hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours.

In some embodiments the polyurethane film is contacted with the swelling agent until maximum swelling of the polyurethane hydrogel is achieved. In some case this may take longer than 24 hours.

In an embodiment the temperature of the swelling agent is room temperature or about 20° C. to about 90° C. Increasing the temperature of the swelling agent can reduce the time required to swell the polyurethane film into a polyurethane hydrogel. Accordingly, the temperature of the swelling agent may be about 20° C., about 25° C., about 30° C., about 35° C., about 40° C., about 45° C., about 50° C., about 55° C., about 60° C., about 65° C., about 70° C., about 75° C., about 80° C., about 85° C., or about 90° C.

Polyurethane Hydrogel

The polyurethane hydrogel formed by contact of the polyurethane film with the swelling agent can have a swelling agent content of between about 1% to about 95%, for example about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%. In some embodiments the swelling agent content is about 45%, about 50%, or about 55%, for example about 54%. In some embodiments the hydrogel has a swelling agent content that approximates, or is the same as, the water content of skin. The general water content of skin is around 64%, accordingly in some embodiments the swelling agent content of the polyurethane hydrogel is about 60% to about 70%, for example about 64%.

In some embodiments the swelling agent is oil or silicon based. In these embodiments the polyurethane hydrogel formed by contact of the polyurethane film with the silicone or oil based swelling agent preferably has a swelling agent content of between about 0.1% to about 30%, for example about 1%, about 2%, about 4%, about 8%, about 10%, about 12%, about 14%, about 16%, about 18%, about 20%, about 22%, about 24%, about 26%, about 28%, or about 30%. For example, the polyurethane hydrogel can have a silicone or oil based swelling agent content of between about 0.1% to about 10%, for example about 0.1%, about 0.5%, about 2%, about 3%, about 4%, about 5%, about 6%, about 7%, about 8%, about 9%, or about 10% after contact with the swelling agent for 24 hours.

In some embodiments the swelling agent is a mixture or hybrid of two or more base swelling agents. For example in some embodiments the swelling agent is a hybrid water: silicone.

The polyurethane hydrogel form by the methods disclosed herein have a number of attributes that make them suitable for use in applications such as condoms. These attributes include suitable linear expansion properties, tensile strength, modulus, the ability to stretch substantially before breaking but yet be impermeable to biological agents and permeable to small molecules.

These attributes can be modulated by choice of one or more of: polymer type, polymer molecular weight range, average molecular weight, n:m range for each polymer, or by blending two or more polymers. In some embodiments, polymers with higher molecular weights produce hydrogels that are stronger but stiffer and less flexible, and polymers with lower molecular weights produce hydrogels that are weaker but softer and more flexible. Accordingly, by blending polymers, choosing polymers with one or more of particular average molecular weight, molecular weight profiles and n:m ratios, a hydrogel can be produced by the methods described herein to have a desired range of attributes (linear expansion, tensile strength, modulus, stretch, impermeability) appropriate for a particular application, for example a condom. These attributes, in addition to the amount and type of swelling agent in the hydrogel, contribute to how a user experiences the hydrogel, that is they contribute to the 'feel' of the hydrogel.

In one embodiment the attributes can be modulated by using polymers with various values for n and m, or a particular n:m ratio. For example the n:m ratio affects the amount of swelling of the hydrogel, which in turn affects the modulus which in turn is related the feel of the hydrogel. It is to be noted that while modulus is an important contributor to the feel of the hydrogel but other attributes and factors such as swelling agent content and type also contribute to feel.

In some embodiments the n:m ratio is 1:0.1 to 1:75. For example suitable n:m ratios include 1:21-26 (corresponding to A in Example 1), 1:25-30 (corresponding to B in Example 1), 1:6.67-13.33 (corresponding to C in Example 1), 1:2.2-2.5 (corresponding to D in Example 1), 1:4.59-5.25 (corresponding to E in Example 1), 1:28.57-34.30 (corresponding to F in Example 1). Given that in some embodiments n and m are averages, the n:m ratios also represent ratios of average n to average m.

In some embodiments the n:m ratio is about 1: any number between 0.1 and 75, for example 1:0.1, about 1:0.5, about 1:1, about 1:5, about 1:10, about 1:15, about 1:20, about 1:25, about 1:30, about 1:35, about 1:40, about 1:45, about 1:50, about 1:55, about 1:60, about 1:65, about 1:70, or about 1:75.

'Linear expansion' refers to the ratio of the change in length to the initial length of the material. In an embodiment, the polyurethane hydrogel film or material has a linear expansion of between about 1% to 100%, for example about 10%, about 20%, about 25%, about 30%, about 35%, about 40%, about 45%, about 50%, about 55%, about 60%, about 65%, about 70%, about 75%, about 80%, about 85%, about 90%, about 95%, or about 100%.

The term 'tensile strength' refers to the maximum force taken by the sample before sample failure. Tensile strength is the ratio of the maximum force and the initial cross area of the sample. In an embodiment, the hydrogel material has a tensile strength of between about 1 MPa to about 100 MPa, for example about 3 MPa, about 4 MPa, about 5 MPa, about 6 MPa, about 7 MPa, about 8 MPa, about 9 MPa, about 10 MPa about 11 MPa, about 12 MPa, about 13 MPa, about 14 MPa, about 15 MPa, about 16 MPa, about 17 MPa, about 18 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, about 80 MPa, about 85 MPa, about 90 MPa, about 95 MPa, or about 100 MPa.

The term 'modulus' as used herein refers to the force at a specific elongation value and relates to hardness of a material. In an embodiment, the hydrogel material has a 50% modulus of about of about 80 kPa to about 15 MPa, 100% modulus of about 200 kPa to about 15 MPa and a 300% modulus of about 700 kPa to 15 MPa.

In one embodiment the 50% modulus is about 80 kPa to about 15 MPa, for example 80 kPa, 100 kPa, 500 kPa, 750 kPa, 1 MPa, 2 MPa, 3 MPa, 4 MPa, 5 MPa, 6 MPa, 7 MPa, 8 MPa, 9 MPa, 10 MPa, 12 MPa, 13 MPa, 14 MPa, or 15 MPa.

In one embodiment the 100% modulus is about 200 kPa to about 156 MPa, for example and 200 kPA, 250 kPa, 500 kPa, 750 kPa, 1 MPa, 2 MPa, 3 MPa, 4 MPa, 5 MPa, 6 MPa, 7 MPa, 8 MPa, 9 MPa, 10 MPa, 12 MPa, 13 MPa, 14 MPa, or 15 MPa.

In one embodiment the 300% modulus is about 700 kPa to 15 MPa, for example 700 kPa, 750 kPa, 1 Mpa, 2 MPa, 3 MPa, 4 MPa, 5 MPa, 6 MPa, 7 MPa, 8 MPa, 9 MPa, 10 MPa, 12 MPa, 13 MPa. 14 MPa, or 15 MPa.

The term "elongation at break" refers to the maximum linear stretch of the material before sample failure is reached. Elongation at break is defined as a percentage (%) increase of material past initial length.

Figure 1:
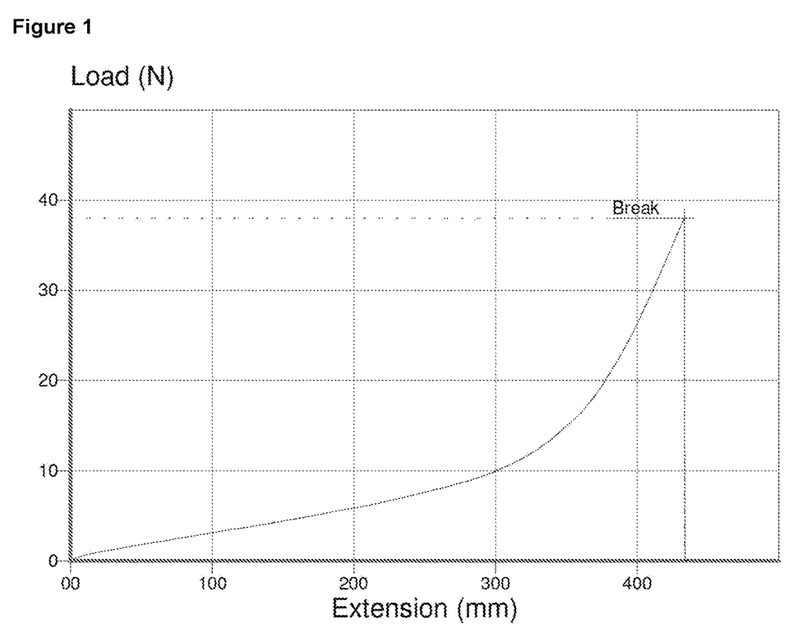
FIG. 1 is an example of a load vs elongation curve for a hydrogel produced with a polymer comprising polymer A. The condom has a double wall thickness of 0.125 mm, width of 58 mm. Sample ring width of 20 mm.
Figure 2:
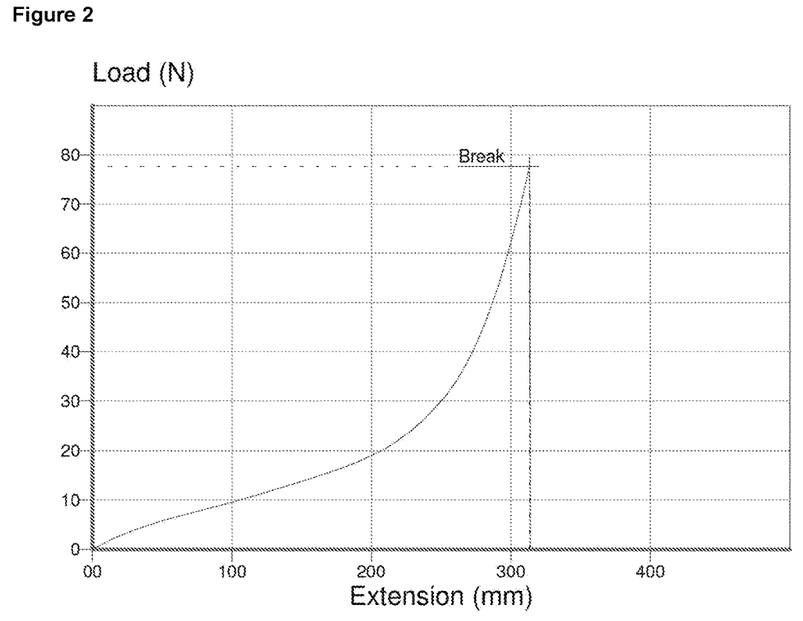
FIG. 2 is an example of a load vs elongation curve for a hydrogel produced with a polymer comprising polymer B. The condom has a double wall thickness of 0.148 mm, width of 53 mm. Sample ring width of 20 mm.

With reference to FIGS. 1 and 2, elongation at break can be calculated using a load vs elongation curve. In each of FIGS. 1 and 2, a 20 mm sample ring of a hydrogel condoms produced by the methods described herein (comprising either polymer A or B), was tested as set out in the Examples. The condom in FIG. 1 had a double wall thickness 0.125 mm, width of 58 mm and in FIG. 2 the condom had a double wall thickness of 0.148 mm and width of 53 mm.

In an embodiment, the hydrogel material has an elongation at break of about 200%, about 300%, about 400%, about 500%, about 600%, about 700%, about 800%, about 900%, about 1000%, about 1100%, about 1200%, about 1300%, about 1400%, about 1500%, about 1600%, about 1700%, about 1800%, about 1900%, or about 2000%.

In an embodiment, the hydrogel is substantially impermeable to biological agents such as viruses or viral models (e.g. phiX174) or bacteria (e.g. *E. coli*). phiX174 has an average diameter of around 30 nm, accordingly, the hydrogel is substantially impermeable to biological agents with an average diameter of 30 nm or greater. In an embodiment, the hydrogel is substantially impermeable to biological agents of 30 nm or greater when a pressure of up to about 10 kPa is applied to the hydrogel. The pressure may be up to about 1 kPa, up to about 2 kPa, up to about 3 kPa, up to about 4 kPa, up to about 5 kPa, up to about 6 kPa, up to about 7 kPa, up to about 8 kPa, up to about 9 kPa, or up to about 10 kPa.

In another embodiment, the hydrogel is permeable to small molecules, such as water-soluble small molecules. The present inventors have demonstrated that the polyurethane hydrogels are permeable to sodium fluorescein (molecular weight 376.275 g/mol) and rhodamine B (molecular weight 479.02 g/mol). Accordingly, the hydrogel is permeable to water soluble small molecules having molecular weight of about 500 g/mol or less.

One advantage of the polyurethane hydrogels described herein, for example when used in condoms, is that they are visually transparent. This is in contrast to conventional latex or polyisoprene condoms.

In one embodiment, a condom formed of the polyurethane hydrogel has a linear expansion of about 40%, a swelling agent content of about 60%, tensile strength of about 15.2 MPa, an elongation at break of about 747% and a 50% modulus of 2.8 about MPa, 100% modulus of about 3.6 MPa and 300% modulus of about 6.7 MPa.

In another embodiment, a condom formed of the polyurethane hydrogel has a linear expansion of about 30%, a swelling agent content of about 50%, a tensile strength of about 26.3 MPa, an elongation at break of about 591% and a 50% modulus of about 2.5 MPa, 100% modulus of about 3.3 MPa and 300% modulus of about 6.6 MPa.

Testing of condoms may involve inflating the condom with air to test the volume of air that can be contained within the condom before it bursts. The volume of air contained in the condom when it bursts is known as the airburst volume. In an exemplary embodiment the hydrogel condoms described herein condom have an airburst volume of about 5 L to 40 L. For example the airburst volume can be about 5 L, about 10 L, about 15 L, about 20 L, about 25 L, about 30 L, about 35 L, about 40 L, about 45 L, to about 50 L.

Additionally, filling a condom with air also increases the pressure and the maximum air pressure at bursting is known as the airburst pressure. In an exemplary embodiment the hydrogel condoms described herein condom have an airburst pressure of about 0.75 kPa to about 4 kPa. For example the airburst pressure may be about 0.75 kPa, about 1 kPa, about 1.25 kPa, about 1.5 kPa, about 1.75 kPa, about 2 kPa, about 2.25 kPa, about 2.5 kPa, about 2.75, kPa, about 3 kPa, about 3.25 kPa, about 3.5 kPa, about 3.75 kPa, about 4 kPa, about 4.25 kPa, about 4.5 kPa, about 4.75 kPa or about 5 kPa. In some embodiments the airburst pressure may be about 1.3 kPa to about 3.6 kPa.

The polyurethane hydrogels have additional favourable attributes including that users report that the polyurethane hydrogel material feels like skin, feels wet, feels soft, feels like the user has no loss of sensation (i.e. feels like nothing), or a combination thereof. In some embodiments the polyurethane hydrogels are visually transparent, such that visual appeal or visual stimulus is not impaired.

In some embodiments the polyurethane hydrogels conduct heat more efficiently than other condom materials, such that the transfer of body heat is less impaired.

The polyurethane hydrogels may also have no adverse odours or tastes.

In some embodiments the polyurethane hydrogels are hypoallergenic, that is they induce no allergic responses.

In some embodiments the polyurethane hydrogels are made to have a plurality of regions with different physical properties (e.g. modulus, linear expansion, elongation at break, airburst pressure etc). This is achieved by use of different polymers for each of the plurality of regions. For example, a condom may be prepared with a higher modulus hydrogel on the internal surface which may feel firm and a lower modulus hydrogel on the external surface which may feel soft, or vice versa. Alternatively of in addition there may be areas of differing moduli, for example a condom having a tip region with a different modulus to the shaft, a shaft having regions, or rings of differing moduli or other attributes. By the use polymers of varying molecular weights, n:m ratios, or both devices can be made using the methods described herein to have distinct and different feel on different aspects of the final device for use; e.g. a condom with various feels along the device eliciting differing sensations for either partner. In particular, the hydrogels can be skin-like.

As set out in Table 1, the attributes of polyurethane hydrogel condoms described herein compare favorably to those of traditional condoms.

TABLE 1

Comparison of attributes of typical condom materials and hydrogel

| Condom Material | Elongation (%) | Strength (MPa) | Inflation Volume (L) | Pressure (kPa) |
|---|---|---|---|---|
| Latex | 700-800 | 25-30 | 28-40 | 1.3-2.5 |
| Polyisoprene | 1036-1050 | 30.1-31.2 | 50-70 | 1.4-1.8 |
| Polyurethane | 443-449 | 38.4-40.2 | 5.5-13.5 | 3.5-14 |
| Hydrogel | 289-797 | 2.9-26.3 | 1-37 | 0.7-4.1 |

EXAMPLES

Example 1: Polyurethane Solution Preparation

Solvent: ethanol:water, where the ratio can range from 60:40 to 95:5, depending on the polyurethane. 90:10 ethanol:water was chosen as the ratio in which of the following polymers comprising each of A-F, below) are readily soluble:

A: $-CH_2-(CH_2-O-CH_2)_n-CH_2-[O-OCHN(C_6H_{10})CH_2(C_6H_{10})NHCO-O-(CH_2CH_2-O-CH_2CH_2)-O-OCHN(C_6H_{10})CH_2(C_6H_{10})NHCO-NH-(C_6H_{10})CH_2(C_6H_{10})NHCO-O-CH_2CH_2-O-CH_2CH_2-O-OCHN(C_6H_{10})CH_2(C_6H_{10})NHCO-O]_m-CH_2-(CH_2-O-CH_2)_n-CH_2$, — where n is an average=5, and m is about 105-130; or B: $-CH_2-(CH_2-O-CH_2)_n-CH_2-[O-OCHN(C_6H_{10})CH_2(C_6H_{10})NHCO-O-(CH_2CH_2-O-CH_2CH_2)-O-OCHN(C_6H_{10})CH_2(C_6H_{10})NHCO-NH-(C_6H_{10})CH_2(C_6H_{10})NHCO-O-CH_2CH_2-O-CH_2CH_2-O-OCHN(C_6H_{10})CH_2(C_6H_{10})NHCO-O]_m-CH_2-(CH_2-O-CH_2)_n-CH_2-$ where n is an average=4 and m is about 100-120;

C: $-CH_2-(CH_2-O-CH_2)_n-CH_2-[O-OCHN(C_6H_{10})CH_2(C_6H_{10})NHCO-O-(CH_2CH_2-O-CH_2CH_2)-O-OCHN(C_6H_{10})CH_2(C_6H_{10})NHCO-NH-(C_6H_{10})CH_2(C_6H_{10})NHCO-O-CH_2CH_2-O-CH_2CH_2-O-OCHN(C_6H_{10})CH_2(C_6H_{10})NHCO-O]_m-CH_2-(CH_2-O-CH_2)_n-CH_2-$ where n is an average=1.5, and m is about 10-20;

D: $-CH_2-(CH_2-O-CH_2)_n-CH_2-[O-OCHN(C_6H_{10})CH_2(C_6H_{10})NHCO-O-(CH_2CH_2-O-CH_2CH_2)-O-OCHN(C_6H_{10})CH_2(C_6H_{10})NHCO-NH-(C_6H_{10})CH_2(C_6H_{10})NHCO-O-CH_2CH_2-O-CH_2CH_2-O-OCHN(C_6H_{10})CH_2(C_6H_{10})NHCO-O]_m-CH_2-(CH_2-O-CH_2)_n-CH_2-$ where n is an average=34, and m is about 75-85

E: $-CH_2-(CH_2-O-CH_2)_n-CH_2-[O-OCHN(C_6H_{10})CH_2(C_6H_{10})NHCO-O-(CH_2CH_2-O-CH_2CH_2)-O-OCHN(C_6H_{10})CH_2(C_6H_{10})NHCO-NH-(C_6H_{10})CH_2(C_6H_{10})NHCO-O-CH_2CH_2-O-CH_2CH_2-O-OCHN(C_6H_{10})CH_2(C_6H_{10})NHCO-O]_m-CH_2-(CH_2-O-CH_2)_n-CH_2-$ where n is an average=30.5, and m is about 140-160.

F: $-CH_2-(CH_2-O-CH_2)_n-CH_2-[O-OCHN(C_6H_{10})CH_2(C_6H_{10})NHCO-O-(CH_2CH_2-O-CH_2CH_2)-O-OCHN(C_6H_{10})CH_2(C_6H_{10})NHCO-NH-(C_6H_{10})CH_2(C_6H_{10})NHCO-O-CH_2CH_2-O-CH_2CH_2-O-OCHN(C_6H_{10})CH_2(C_6H_{10})NHCO-O]_m-CH_2-(CH_2-O-CH_2)_n-CH_2-$ where n is an average=7, and m is about 200-240.

Polymer solution: above polymers are separately dissolved in solvent (EtOH:W 90:10 v/v). The polymer concentration can range from 1% w/v up to 10% w/v to form films. The 6% w/v concentration was chosen to make all films (see Table 2). However, for the dip coating process, the concentration can be further optimized to control the film quality and number of dippings needed to reach a desired thickness.

The mixture is stirred overnight to solubilise the polymers. Heating to 70° C. increases the rate of solubilisation.

Stress of a hydrogel prepared in the above examples was measured as a function of elongation using 'dog-bone' shaped samples of the hydrogel, with extension at a rate of 500 mm/min. The stress was calculated by finding the ratio of force and the initial cross-sectional area of the dog-bone sample. Elongation was defined as the ratio of elongated length and the initial length. The modulus is calculated by giving the stress at 50%, 100% and 300% sample elongation

TABLE 2

Exemplary hydrogels and their approximate properties

|  | A | B | C | D | E | F |
|---|---|---|---|---|---|---|
| Composition % | | | | | | |
| Ethanol (v/v) | 90 | 90 | 90 | 90 | 90 | 90 |
| Water (v/v) | 10 | 10 | 10 | 10 | 10 | 10 |
| A (w/v) | 6 | — | — | — | | |
| B (w/v) | — | 6 | — | — | | |
| C (w/v) | — | — | 6 | — | | |
| D (w/v) | — | — | — | 6 | | |
| E (w/v) | | | | | 6 | |
| F (w/v) | | | | | | 6 |
| Average polymer Mw (kDa) | 115 | 124 | 15 | 85 | 157 | 233 |
| Modulus range | | | | | | |
| Modulus 50% (MPa) | 1.9-2.3 | 3.4-4.0 | 11.9-12.1 | 0.1-10.4 | 0.3-9.1 | 0.5-1.3 |
| Modulus 100% (MPa) | 2.5-3.2 | 4.5-4.7 | 12.4-12.6 | 0.3-10.5 | 0.6-9.9 | 0.8-1.7 |
| Modulus 300% (MPa) | 4.2-4.5 | 6.3-7.5 | 13.6-13.6 | 0.8-12.0 | 1.8-12.3 | 1.8-2.3 |

Example 2: Swelling Agent Compatibility

To examine one avenue of swelling compatibility of the polymers, a series of personal care products were examined.

latex or polyisoprene which cannot be used with oil-based lubricants as oil degrades the material. Additionally, the hydrogels are compatible with silicone lubricants which are not recommended for use with silicone toys.

TABLE 3

Lubricant types

| Lubricant | Base | Ingredients | Linear Expansion |
|---|---|---|---|
| Durex KY Personal Lubricant | Water-based | Water, glycerine, hydroxyethylcellulose, gluconolactone, methylparaben, sodium hydroxide, chlorhexidine digluconate | Up to ~45% |
| Durex Naturals Intimate Gel | Water-based | Water, glycerine, propanediol, xanthan gum, Inulin, benzoic acid, alpha-glucan oligosaccharide, potassium lactate, lactic acid | Up to ~40% |
| Four Seasons Passion Lubricant | Water-based | Purified Water, glycerine, hydroxyethylcellulose, potassium sorbate, sodium benzoacte, peppermint oil, sodium lactate, EDTA | Up to ~45% |
| Four Seasons Pure Lubricant | Water-based | Purified Water, Zemea Steareth-2, Xanthan gum, carrageenan, sodium benzoacte, potassium sorbate, Vitamin E, sodium lactate | Up to ~45% |
| Lifestyles Silky Smooth Lubricant | Water-based | Glycerine, deionized water, vegetable gum (methylcellulose), preservative (phenoxyethanol) | Up to ~25% |
| Microcyn Skin Care | Water-based | Electrolyzed Water, Sodium Chloride (NaCl), Sodium Hypochlorite (NaOCl), and Hypochlorous Acid (HOCl) | Up to ~40% |
| Epicyn Hydrogel | Water-based | MicroHeal ® Super-Oxidised Solution, Polydimethylsiloxane | Up to ~40% |
| Durex Perfect Glide | Silicone-based | 100% silicone (Cyclomethicone, dimethiconol) | <5% |
| Lifestyles Luxe Lubricant | Silicone-based | 100% silicone (Cyclomethicone, dimethiconol) | <5% |
| Jo Classic Hybrid Personal Lubricant | Hybrid water-silicone | Propylene Glycol, Water (Aqua), Phenoxyethanol, Dimethicone, Cellulose Gum, Cyclopentasiloxane, Sodium Polyacrylate Trideceth-6, PEG/PPG- 18/18 Dimethicone | Up to ~45% |
| Bonk Lube Personal Lubricant | Oil-based | *Helianthus Annuus* (Sunflower) Seed Oil, *Simmondsia Chinensis* (Jojoba) Oil, Cera Alba (Beeswax), *Theobroma Cacao* (Cocoa Seed) Butter, *Butyrospermum Parkii* (Shea Butter) | <5% |
| YES OB Plant Oil Lubricant | Oil-based | *Helianthus annuus* (Sunflower) seed oil, *Butyrospermum parkii* (Shea butter), *Prunus dulcis* (Sweet almond oil), Cera alba (Beeswax), *Theobroma cacao* (Cocoa) seed butter, Tocopherol (Vitamin E) | <5% |

Polymer sheets were cast by adding 5 mL of 6% (w/v) polymer solution to a mould. The dried sheets were cut into shapes and measured by length. The polymers were then soaked in various swelling compounds, being commercially available sexual and wellness products. Polymers were left for 24 hours in the swelling agent and remeasured to determine immediate swelling as compared to control and dry materials.

A variety of polymers as well as lubricant types, including water-based, silicone-based, and oil-based formulations, were examined as set out in Table 3.

Measurements of linear expansion of hydrogels swelled with various personal care products were examined. Table 3 shows examples from Polymer A and Polymer B. The tensile strengths were analysed for each base type and the results showed no lubricant-based swelling agent reduced the tensile strength. The results indicate that the hydrogel condoms have a wider conformity to lubricant options than traditional Example 3: Condom Prototype Production A dip coating process was used to make the condom prototypes, in which a cylindrical mould is dipped into the heated polymer solution. Moulds are preferably made of glass or metal. The inventors found that plastic moulds are not ideal as there is a tendency for the polyurethane solution to unevenly coat the mould after dipping.

In one experiment multiple glass or metal moulds are assembled into a mould-rig in order to produce multiple prototype condoms.

Polymer solution is placed in a large container, where the container is wide enough to accommodate the rig and the height of the container is all enough to account for liquid displacement. The container is placed under the rig.

The polymer solution in the container is heated to (25° C.) with constant stirring. Moulds are dipped into the polymer solution and withdrawn at a speed of between 20-200 mm/s and the polymer solution covered after removal of the moulds to minimise solvent evaporation.

The moulds, having had the polymer solution applied to them, are held at room temperature for at least 5 to 10 mins until solvent evaporates from the coating and a polyurethane film is formed on the mould. This time can be significantly shortened if drying takes place at elevated temperatures for example in an oven or a dehydrator.

Repetition of the dipping and drying process increases thickness of the polyurethane film that will from the condom. The polymers were typically dipped 1 to 6 times to create condoms.

In some cases there was a series of dips with a polymer of one molecular weight, and a dip or series of dips with a polymer of another molecular weight to create the condoms.

In one instance a condom was produced with a first layer of hydrogel comprising polymer A and a second layer of hydrogel comprising polymer B. In another instance a condom was produced with a first layer of hydrogel comprising polymer B and a second layer of hydrogel comprising polymer A.

Once solvent is completely evaporated from the coated moulds, the mould-rig containing can be immersed in a container filled with an excess of a swelling agent or (hydration solution) to swell the dried film to form a hydrogel.

Example 4: ISO Standard Condom Testing

The data below are results from standard traditional international tests for condoms. The tests are from ISO 23409:2011 Male Condoms—Requirements and test methods for condoms made from synthetic materials and ISO 4074:2015 Natural rubber latex male condoms—Requirements and test methods as required for batch test qualification of condoms. Tensile testing does not currently appear in ISO or ASTM protocols, but it is a useful guide in the development of alternative condom materials.

Condoms were produced using selections of polymers A and B (as above). Testing was performed by Enersol, and independent Quality Assurance Testing Equipment and Service accredited as complying with the requirements of ISO 17025:2017 and ISO 9001:2015 and tested dimensions, tensile testing, airburst and leakage tests.

To measure length, the condom is stretched slightly (5 percent to 10 percent) to smooth out wrinkles caused by having been rolled up and then hung over a graduated mandrel. The width is measured at a right angle to the length of the condom, when it is unrolled and laid flat without any creases. Typically, three thickness measurements are made for each sample condom, and an average is determined. Table 4 provides measurements from condoms denoted as Condom Type A and Condom Type B; in each case the condom type was defined as where a majority component of the condom was the corresponding polymer type from Table 2.

TABLE 4

Condom measurements

| | Low (mm) | Mean (mm) | High (mm) |
|---|---|---|---|
| Thickness | | | |
| Condom Type A | 0.108 | 0.120 | 0.132 |
| Condom Type B | 0.08 | 0.122 | 0.190 |

TABLE 4-continued

Condom measurements

| | Low (mm) | Mean (mm) | High (mm) |
|---|---|---|---|
| Width | | | |
| Condom Type A | 57 | 58.5 | 59 |
| Condom Type B | 53 | 55.9 | 59 |

The tensile strength of the condoms was assessed using a 20 mm-wide sample cut from the mid-section of the condom. The test stretches this cross-sectional piece (ring) of the material until it breaks, using a constant rate of circular motion and applying pressure equally to the entire piece of condom. The test measures the force it takes to break the material (breaking force, in Newtons); the length of the material piece when it breaks (percent elongation, percent increase from initial to final circumference); and tensile breaking strength (megapascals), a calculation using the thickness of the material and the Newtons of breaking force. Table 5 provides tensile strength measurements from condoms comprising polymer A or polymer B.

TABLE 5

Condom tensile strength

| Tensile Strength | Low (MPa) | Mean (MPa) | High (MPa) |
|---|---|---|---|
| Condom Type A | 2.9 | 8.6 | 15.2 |
| Condom Type B | 3.4 | 10.5 | 26.3 |
| Force at Break | Low (N) | Mean (N) | High (N) |
| Condom Type A | 6.8 | 20.7 | 35.5 |
| Condom Type B | 7.2 | 25.6 | 77.7 |
| Material Elongation | Low (%) | Mean (%) | High (%) |
| Condom Type A | 421 | 663 | 763 |
| Condom Type B | 286 | 627 | 797 |

Airburst pressure and volume was assessed by inflating the condom like a balloon to measure the volume of air and air pressure needed to burst it. The condom is unrolled and clamped to a stem, leaving about 150 mm to be inflated. The testing apparatus inflates the condom with clean, oil-free and moisture-free air at a specified rate. Table 6 provides airburst pressures from condoms comprising polymer A or polymer B.

TABLE 6

Condom airburst pressures

| Pressure | Low (kPa) | Mean (kPa) | High (kPa) |
|---|---|---|---|
| Condom Type A | 0.70 | 1.02 | 1.30 |
| Condom Type B | 0.75 | 1.71 | 4.10 |
| Volume | Low (L) | Mean (L) | High (L) |
| Condom Type A | 3.0 | 20.2 | 29.5 |
| Condom Type B | 1.0 | 15.0 | 37.0 |

Leakage tests were performed using the hang method in which the condom is filled with water, usually while hanging vertically, and an observer checks for leaks. In addition, the end of the water filled condoms are tied and then rolled across an absorbent paper looking for water on the paper. Tests were performed on examples from various batches of condoms and passed the freedom from holes (leakage) test.

Additional condoms were made by adding layers of various polymers. In one example a condom made from polymer A was layered with polymer B, and vice versa. In these examples the condoms had differing properties as seen in Table 1. Condoms were tested for mechanical properties and met or exceeded the ISO standard, and were within the parameters seen in the mechanical testing results above.

Example 5: Bacteriophage Barrier Testing

Polymers A and B were tested for biological barrier properties and prevent diffusion of the small bacterial virus (bacteriophage (V-X174) when used as a challenge particle. The use of φ-X174 is known as the viral penetration test, and is typically conducted to check the barrier properties of condoms (based on ISO 23409:2011). In those tests, a sample condom is restrained, and the condom is filled with a suspension of surrogate virus bacteriophage φ-X174. By submerging the sample into a collection fluid, the leakage of viral particles through the sample can be detected by analyzing the fluid for the presence of viral particles.

Hydrogel materials A and B were clamped between donor and receiver chambers of a Franz cell. The receptor compartment was filled with phosphate buffered saline (PBS) and the donor chamber was loaded with (V-X174 bacteriophage in PBS. Samples were withdrawn from the receptor compartment for analysis and phage quantification by plaque formation assay. As positive control, materials were compromised by piercing with a 25 G needle. The test materials showed they were not permeable to φ-X174.

A test was also performed on restrained and pressurized condoms made from polymer A and polymer B. The condoms passed the viral penetration test.

Additionally hydrogels A and B were exposed to *E. Coli*, a bacteria that causes urinary tract infections. Hydrogel materials A and B were clamped between donor and receiver chambers of a Franz cell. The receptor compartment was filled with phosphate buffered saline and the donor chamber was loaded with *E. coli* in PBS. Samples were withdrawn from the receptor compartment for analysis by growth on LB agar plates, no growth of *E. coli* was observed in samples taken from the receptor compartment. As a positive control, hydrogel materials were compromised by piercing with a 25 G needle. The test materials showed they were not permeable to *E. coli*.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of producing a moulded polyurethane hydrogel, the method comprising:
    forming a first solution of at least one polyurethane having a molecular weight of between about 40000 to about 500000 in a water: organic polar solvent comprising less than about 40% (v/v) water;
    applying a layer of the first solution to a mould;
    drying the layer of the first solution to form a polyurethane film on the mould; and
    contacting the polyurethane film with a swelling agent under conditions such that the film forms a polyurethane hydrogel with a swelling agent content of between about 1% to about 95%,
    wherein the polyurethane consists of $-CH_2-(CH_2-O-CH_2)_n-CH_2-[O-OCHN(C_6H_{10})CH_2(C_6H_{10})NHCO-O-(CH_2CH_2-O-CH_2CH_2)-O-OCHN(C_6H_{10})CH_2(C_6H_{10})NHCO-NH-(C_6H_{10})CH_2(C_6H_{10})NHCO-O-CH_2CH_2-O-CH_2CH_2-O-OCHN(C_6H_{10})CH_2(C_6H_{10})NHCO-O]_m-CH_2-(CH_2-O-CH_2)_n-CH_2$ and methyl and/or hydroxyl end groups, and wherein
    n is an average independently selected from any number from 1 to 35; and
    m is an average independently selected from any number from 15 to 500.

2. The method of claim 1, wherein the molecular weight of the polyurethane is about 40000 to about 200000, about 150000 to about 350000, or about 300000 to about 500000.

3. The method of claim 1, wherein the polyurethane is derived from polymerisation of 4,4'-dicyclohexylmethane diisocyanate.

4. The method of claim 1, wherein the polyurethane is a polyether-based polyurethane.

5. The method of claim 4, wherein the polyether-based polyurethane is derived from polymerisation of 4,4'-dicyclohexylmethane diisocyanate and a polyether.

6. The method of claim 5, wherein the polyether comprises one to 35 ethyl ether groups.

7. The method of claim 1, wherein the organic polar solvent is selected from the group consisting of ethanol, methanol, isopropanol, butanol, tetrahydrofuran, dimethylformamide, dimethylsulfoxide, acetone, acetonitrile and any combination thereof.

8. The method of claim 7, wherein the organic polar solvent is ethanol.

9. The method of claim 1, wherein the ratio of water: organic polar solvent is selected from about 5:95, about 10:90, about 15:85, about 20:80, about 25:75, about 30:70, about 35:65, or about 40:60.

10. The method of claim 9, wherein the ratio of water: organic polar solvent is about 10:90.

11. The method of claim 1, wherein a swelling agent is selected from at least one of water, a glycol solution, a hydroxyethylcellulose solution, a paraben-based solution, a glycol-based solution, a glycerine based solution, an oil-based solution, or a silicone-based solution.

12. The method of claim 11, wherein the swelling agent comprises one or more of spermicide, lubricating agent, antiviral, antifungal, antimicrobial, prebiotic, probiotic, microbiome enhancer, flavour compound, aroma compound, sensation enhancing agent, sterilization agent, or disinfecting agent.

13. The method of claim 1, wherein polyurethane film is contacted with the swelling agent for at least 1 second at ambient temperature.

14. The method of claim 1 further comprising:
    forming a second solution of at least one polyurethane having a molecular weight of between about 40000 to about 200000, about 150000 to about 350000, or about 300000 to about 500000 in a water: organic polar solvent comprising less than about 40% (v/v) water;
    applying a layer of the second solution to the polyurethane film on the mould;
    drying the layer of the second solution, wherein the layers form a polyurethane film on the mould; and contacting the polyurethane film with a swelling agent under conditions such that the film forms a polyurethane hydrogel with a swelling agent content of between about 1% to about 95%, wherein the polyurethane comprises —$CH_2$—($CH_2$—O—$CH_2$)$_n$—$CH_2$—[O—OCHN($C_6H_{10}$)$CH_2$($C_6H_{10}$)NHCO—O—($CH_2CH_2$—O—$CH_2CH_2$)—O—OCHN($C_6H_{10}$)$CH_2$($C_6H_{10}$)NHCO—NH—($C_6H_{10}$)$CH_2$($C_6H_{10}$)NHCO—O—$CH_2CH_2$—O—$CH_2CH_2$—O—OCHN($C_6H_{10}$)$CH_2$($C_6H_{10}$)NHCO—O]$_m$—$CH_2$—($CH_2$—O—$CH_2$)$_n$—$CH_2$, wherein n is an average independently selected from any number from 1 to 35; and m is an average independently selected from any number from 15 to 500.

15. The method of claim 14, wherein the ratio of n:m is from about 1:0.1 to about 1:75.

16. The method of claim 14, wherein the at least one polyurethane in the second solution is not the same as the at least one polyurethane in the first solution.

17. The method of claim 1, further comprising applying a subsequent layer of the first or second solution to the polyurethane film on the mould to increase thickness, or to create a specific feature, of the polyurethane film.

18. The method of claim 1, further comprising applying a subsequent layer of the first or second solution to a portion of the polyurethane film on the mould to increase thickness or to create a specific feature on a portion of the polyurethane film.

19. The method of claim 18, wherein the specific feature formed from the subsequent layer has a different modulus, tensile strength, and/or linear expansion range than the hydrogel formed from the layer to which it is applied.

20. The method of claim 14, wherein either or both of the molecular weight and n:m ratio, of the at least one polyurethane in the first solution is different to the molecular weight and n:m ratio of the at least one polyurethane in the second solution.

21. The method of claim 14, wherein additional subsequent layers are applied to increase the thickness to a predetermined value.

22. The method of claim 1, wherein the moulded polyurethane hydrogel has a linear expansion range of about 1% to about 100%.

23. The method of claim 1, wherein the moulded polyurethane hydrogel has a tensile strength of about 1 MPa to about 100 MPa; about 1 MPa to about 20 MPa, about 20 MPa to about 60 MPa, about 60 MPa to about 80 MPa, about 60 MPa to about 80 MPa.

24. The method of claim 1, wherein the moulded polyurethane hydrogel has an elongation at break range of about 200% to about 2000%.

25. The method of claim 1, wherein the moulded polyurethane hydrogel has at least one of a 50% modulus of about 80 kPa to about 15 MPa, a 100% modulus of about 200 kPa to about 15 MPa, and a 300% modulus of about 700 kPa to about 15 MPa.

26. A moulded polyurethane hydrogel condom produced by the method of claim 1.

27. A moulded polyurethane hydrogel condom, wherein the polyurethane hydrogel comprises a polyurethane having a molecular weight of between about 40000 to about 500000 and a swelling agent content of between about 40% to about 70%, wherein the polyurethane consists of —$CH_2$—($CH_2$—O—$CH_2$)$_n$—$CH_2$—[O—OCHN($C_6H_{10}$)$CH_2$($C_6H_{10}$)NHCO—O—($CH_2CH_2$—O—$CH_2CH_2$)—O—OCHN($C_6H_{10}$)$CH_2$($C_6H_{10}$)NHCO—NH—($C_6H_{10}$)$CH_2$($C_6H_{10}$)NHCO—O—$CH_2CH_2$—O—$CH_2CH_2$—O—OCHN($C_6H_{10}$)$CH_2$($C_6H_{10}$)NHCO—O]$_m$—$CH_2$—($CH_2$—O—$CH_2$)$_n$—$CH_2$ and methyl and/or hydroxyl end groups, and wherein n is an average independently selected from any number from 1 to 35; and m is an average independently selected from any number from 15 to 500.

28. The moulded polyurethane hydrogel condom of claim 27, having one or more of linear expansion range of about 1% to about 100%, tensile strength of about 1 MPa to about 40 MPa, elongation at break range of about 200% to about 750%, and at least one of a 50% modulus of about 80 kPa to about 15 MPa, a 100% modulus of about 200 kPa to about 15 MPa, and a 300% modulus of about 700 kPa to about 15 MPa.

29. The moulded polyurethane hydrogel condom of claim 27, wherein the condom is substantially impervious to biological agents having an average diameter of 30 nm or greater.

30. The moulded polyurethane hydrogel condom of claim 27, wherein the condom is substantially impervious to biological agents having an average diameter of 30 nm or greater under simulated usage pressures from atmospheric pressure to about 5 kilopascals.

31. The moulded polyurethane hydrogel condom of claim 27, having an airburst volume of about 5 L to about 50 L.

32. The moulded polyurethane hydrogel condom of claim 31, wherein the airburst volume is 5 L to 40 L.

33. The moulded polyurethane hydrogel condom of claim 27, having an airburst pressure of about 0.75 kPa to about 5 kPa.

34. The moulded polyurethane hydrogel condom of claim 33, wherein the airburst pressure is 1.6 kPa to 3.6 kPa.

* * * * *